United States Patent [19]
Polsak et al.

[11] 3,788,244
[45] Jan. 29, 1974

[54] COMBUSTION CHAMBER INCLUDING DRY AND WET COLLECTION OF PARTICULATE MATTER

[75] Inventors: Edwin Mark Polsak, South Euclid; Donald Joseph Kalfas, Garfield Heights, both of Ohio

[73] Assignee: Combustion Engineering Inc., Windsor, Conn.

[22] Filed: Dec. 20, 1972

[21] Appl. No.: 316,791

[52] U.S. Cl. .................... 110/8 R, 55/257, 110/119
[51] Int. Cl. .............................................. F23g 5/00
[58] Field of Search ...... 55/227, 228, 257; 110/8 R, 110/8 A, 119

[56] References Cited
UNITED STATES PATENTS

| | | | |
|---|---|---|---|
| 2,707,444 | 5/1955 | Van Loon | 110/28 |
| 3,420,195 | 1/1969 | Kalika | 110/119 |
| 3,605,386 | 9/1971 | Erwin et al. | 110/119 X |

*Primary Examiner* — Kenneth W. Sprague
*Attorney, Agent, or Firm* — Robert L. Olson

[57] ABSTRACT

A combustion chamber having an upper cylindrical portion and a lower frustoconical portion, into which combustibles are tangentially introduced in the upper portion thereof. Incombustible solids centrifugally separated are removed through a lower outlet. An upper outlet duct means positioned within the upper cylindrical portion provides egress for the hot gases and entrained fines. A water spray and baffle arrangement located in the outlet duct means subjects the gases to a precooling and wet scrubbing action, for removing the fines therefrom.

4 Claims, 2 Drawing Figures

PATENTED JAN 29 1974 3,788,244

COMBUSTION CHAMBER INCLUDING DRY AND WET COLLECTION OF PARTICULATE MATTER

BACKGROUND OF THE INVENTION

A common method today of disposing of refuse is by incineration. In order to clean the combustion gases leaving the incineration or combustion chamber before discharge to the atmosphere, a wet scrubber is used for removing flyash and other solid particulate matter. Most of these units are large and bulky, having a high initial cost. In addition, there is the problem of how to economically remove the solids from the scrubber water, so that it can be reused, or disposed of without creating water pollution. The incinerator of the present invention is a compact, economical arrangement incorporating dry solids separation for the larger particles entrained in the combustion gases, and also wet scrubbing to remove the fines before the combustion gases are discharged to the atmosphere. Since a major part of the solids are removed prior to wet scrubbing, the problem of cleaning the scrubber water is greatly reduced.

SUMMARY OF THE INVENTION

The incinerator of the present invention has a cylindrical upper portion and a lower frustoconical portion. The combustibles are tangentially introduced into the upper portion of the incinerator, thereby increasing their residence time within the incinerator. Flyash and other large solids centrifugally separated from the combustion gases are removed through a lower outlet. An upper outlet duct positioned within the cylindrical portion of the combustion chamber contains a plurality of water sprays and baffles for precooling and wet scrubbing the gases, thus removing the fines before the gases are discharged to the atmosphere.

DESCRIPTION OF THE PREFERRED EMBODIMENT

Figures 1, 2:
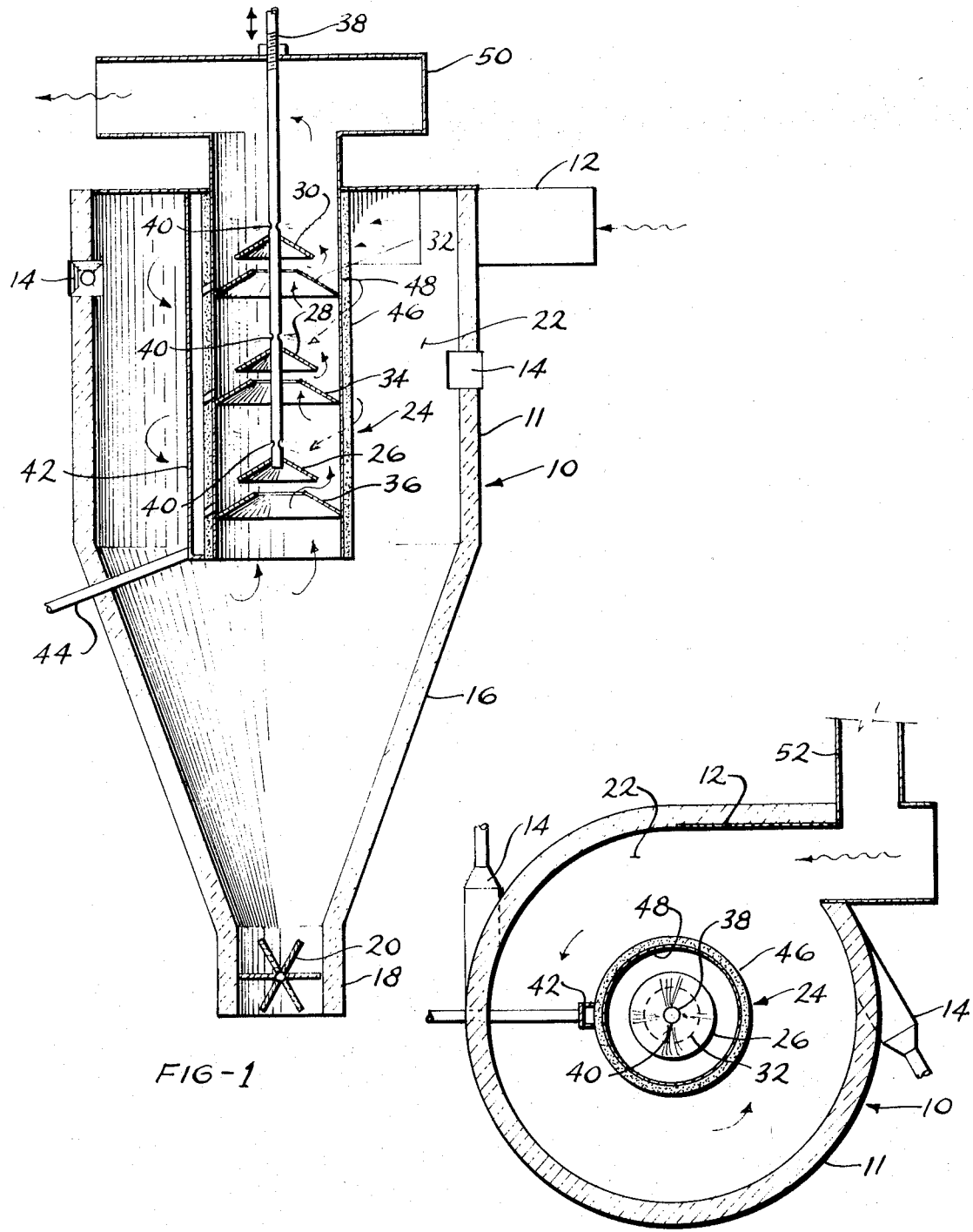
FIG. 1 is a cross sectional side view of a combustion chamber including dry and wet collection of solid particulate matter from the combustion gases.
FIG. 2 is a sectional view taken on lines 2—2 of FIG. 1.

Referring to FIG. 1, 10 designates the incinerator arrangement in its entirety. The combustion chamber has an upper cylindrical portion 11, and a lower frustoconical portion 16. Material to be burned, for example, shredded refuse, saw dust or small wood chips, are carried in an air stream and introduced tangentially into the upper portion of cylinder 11. Tangential burners 14 direct flames into the cylinder 11 for igniting and burning the combustibles in the material introduced at 12. The large particles of flyash and other noncombustibles are centrifugally thrown outwardly into contact with the walls of cylinder 11 and frustoconical portion 16, and gravitate towards the bottom outlet 18, and can be discharged through the rotary air lock 20.

The gases carrying the fines flow upwardly, and exit through outlet duct means 24, which is housed in and is concentric with cylinder 11. An extension of this duct 24 passes through top closure wall 22, and exhaust to the atmosphere by way of fan 50. Located within duct 24 are a plurality of conical baffle members 26, 28 and 30. Each of these baffles has a complementary inverted frustoconical baffle 32, 34 and 36 spaced slightly below it. These frustoconical baffles are attached to and supported by the inner walls of duct 24. The conical baffles 26, 28 and 30 are attached to and supported by a water inlet pipe 38. The baffles can be moved vertically by movement of the water pipe so as to adjust the pressure drop thereacross. Above each baffle is a plurality of spray nozzles 40 for forming a water spray through which the combustion gases carrying the entrained fines must pass.

The conical and frustoconical baffles have portions that overlie each other, so that the water droplets that run down the inclined surfaces of the conical baffles falls onto the frustoconical baffle therebeneath. This prevents any wash water from falling down into the furnace, which would wet the dry flyash being collected in the bottom of the frustoconical section 16. It could also cause spalling or cracking of the refractory walls of the furnace, leading to more frequent shutdown and maintenance. Horizontal passages 43 extend from the areas just above the frustoconical baffles where they are joined to the wall of duct 24, through which the wash water now carrying much of the fines, can discharge into vertical pipe 42. Pipe 44 carries the dirty water out of the combustion chamber, where it can be cleaned and recycled, or disposed of.

Since only fines are washed out of the combustion gases by the water sprays, with the major portion of the solids being dry separated out of the gases by centrifugal action in the furnace, a relatively simple filter arrangement should suffice for cleaning the water.

The duct 24 has an outer refractory lining 46, so as to be able to withstand temperatures of 1400°F. and hotter which are present in the furnace. The duct 24 has an inner lining 48 of corrosion resistant metal, which will not be damaged by the corrosive effects of the dirty wash water. As shown in FIG. 2, a duct 52 can supply additional air to the furnace through inlet 12 if it is needed for complete combustion of the shredded refuse.

Although the unit has been described in relation to the chamber being used for combustion of shredded refuse, it could also be advantageously used as an after burner chamber for burning combustibles carried in dirty gases originating in a separate processing plant. With the burners 14 removed, the unit would also operate effectively as a combination dry and wet separator for hot dirty gases of any type.

What is claimed is:

1. In combination, a chamber having an upper cylindrical portion and a lower frustoconical portion, closure means for closing the top of the cylindrical portion, means for introducing hot dirty gases tangentially into the chamber, outlet means positioned in the bottom of the frustoconical portion through which centrifugally separated solids can be discharged, outlet duct means extending through the closure means and extending downwardly in concentric arrangement within the cylindrical portion, the lower end of the outlet duct means being open, through which the relatively clean hot gases can flow, a plurality of vertically spaced baffle means positioned within the outlet duct means, each baffle means consisting of an upper conical baffle concentric with the outlet duct means, the apex of which is at the top, and a lower frustoconical baffle spaced below the conical baffle, the frustoconical baffle being attached at its outer edge to the outlet duct means, and extending upwardly and inwardly therefrom, the conical and frustoconical baffles being of such size that they have vertically spaced, overlapping portions, means positioned above each conical baffle for introducing water onto the upper surface of each conical baffle, and pipe means extending from a point slightly above each frustoconical baffle to a point outside the chamber, through which water and entrained solids can be discharged.

2. The combination set forth in claim 1, wherein the means for introducing hot dirty gases tangentially into the chamber is burner means.

3. The combination set forth in claim 1, including means for vertically moving the upper conical baffles with respect to the lower frustoconical baffles.

4. The combination set forth in claim 2, wherein the outlet duct means has a refractory lining on its outer surface, and a corrosion resistant metal lining on its inner surface.

* * * * *